(12) United States Patent
Varney et al.

(10) Patent No.: US 9,119,481 B2
(45) Date of Patent: Sep. 1, 2015

(54) JUVENILE SEAT ASSEMBLY

(71) Applicant: Cosco Management, Inc., Wilmington, DE (US)

(72) Inventors: Jim R Varney, Maynard, MA (US); Bryan R Hotaling, Harvard, MA (US)

(73) Assignee: Dorel Juvenile Group, Inc., Foxboro, MA (US)

( * ) Notice: Subject to any disclaimer, the term of this patent is extended or adjusted under 35 U.S.C. 154(b) by 0 days.

(21) Appl. No.: 13/912,748

(22) Filed: Jun. 7, 2013

(65) Prior Publication Data

US 2014/0054936 A1    Feb. 27, 2014

Related U.S. Application Data

(60) Provisional application No. 61/692,515, filed on Aug. 23, 2012.

(51) Int. Cl.
| | |
|---|---|
| A47C 7/50 | (2006.01) |
| A47C 20/00 | (2006.01) |
| A47D 1/00 | (2006.01) |
| B60N 2/28 | (2006.01) |

(52) U.S. Cl.
CPC ............. *A47D 1/008* (2013.01); *B60N 2/2872* (2013.01); *B60N 2/2881* (2013.01)

(58) Field of Classification Search
CPC ..... B60N 2/2872; B60N 2/2881; A47D 1/008
USPC ......... 297/281, 148, 149, 150, 152, 153, 154, 297/423.25, 423.4, 440.1, 440.22, 440.23, 297/423.1, 411.43
See application file for complete search history.

(56) References Cited

U.S. PATENT DOCUMENTS

| | | | | |
|---|---|---|---|---|
| 2,532,812 | A * | 12/1950 | Huber | 297/149 |
| 2,971,570 | A * | 2/1961 | Vander Bush | 297/17 |
| 3,542,419 | A * | 11/1970 | Spinola | 297/130 |
| 4,807,928 | A * | 2/1989 | Cone | 297/153 |
| 4,938,603 | A * | 7/1990 | Turner et al. | 297/16.1 |
| 5,165,755 | A * | 11/1992 | Rho | 297/344.18 |
| 5,332,241 | A * | 7/1994 | Rho | 297/344.14 |
| 5,806,922 | A * | 9/1998 | Mendelovich | 297/130 |
| 5,951,102 | A * | 9/1999 | Poulson et al. | 297/130 |
| 5,992,932 | A | 11/1999 | Kain et al. | |
| 6,024,412 | A * | 2/2000 | Kain et al. | 297/467 |
| 6,050,643 | A * | 4/2000 | Kain et al. | 297/344.18 |
| 6,293,623 | B1 | 9/2001 | Kain et al. | |
| 8,240,765 | B2 * | 8/2012 | Kennedy et al. | 297/338 |
| 8,308,230 | B2 * | 11/2012 | Zhong | 297/148 |

\* cited by examiner

*Primary Examiner* — Chi Q Nguyen
(74) *Attorney, Agent, or Firm* — Barnes & Thornburg LLP (57) ABSTRACT

A juvenile seat assembly includes a seat bottom and legs for elevating the seat bottom above the ground to support a child seated on the seat bottom in an elevated position above the underlying ground. In illustrative embodiments, the juvenile seat assembly further includes a seat back arranged to extend upwardly from a rear edge of the seat bottom.

27 Claims, 7 Drawing Sheets

JUVENILE SEAT ASSEMBLY

PRIORITY

This application claims priority under 35 U.S.C. §119(e) to U.S. Provisional Application Ser. No. 61/692,515, filed Aug. 23, 2012, which is expressly incorporated by reference herein.

BACKGROUND

The present disclosure relates to a juvenile seat, and particularly to a juvenile seat assembly including a seat and seat-support legs coupled to the chair. More particularly, the present disclosure relates to a high chair for young children.

SUMMARY

According to the present disclosure, a juvenile seat assembly includes a seat bottom and legs for elevating the seat bottom above the ground to support a child seated on the seat bottom in an elevated position above the underlying ground. In illustrative embodiments, the juvenile seat assembly further includes a seat back arranged to extend upwardly from a rear edge of the seat bottom.

In illustrative embodiments, the juvenile seat assembly is a high chair adapted for use to feed young children. The juvenile seat assembly includes separate and spaced-apart first and second molded side frames that are molded of a plastics material to include slots or other fixtures sized to receive and orient portions of other components. These other components include, for example, a footrest, a rear strut, a seat bottom, and a seat back. In illustrative embodiments, these other components are made of wood. Fasteners are used to retain these wooden components in predetermined fixed positions relative to the spaced-apart first and second side frames so that the wooden components cooperate with the molded side frames made of a plastics material to form a high chair that appears to an observer to be made primarily of wood. In other embodiments, these other components are made of any suitable material.

In illustrative embodiments, a tray unit is mounted for sliding movement on a first armrest provided by the first molded side frame and on a second armrest provided by the second molded side frame. Each molded side frame is molded using a plastics material to form outwardly facing latch-receiving slots sized to receive inwardly extending lugs included in latches mounted on a slidable tray top for movement into and out of the companion latch-receiving slots at the option of a caregiver. In an illustrative embodiment, these outwardly facing latch-receiving slots are formed in an outer shell that is coupled to an outboard portion of a companion armrest. The tray top is arranged to slide on the armrests toward and away from the seat back. The latches are movable relative to the slidable tray top to engage the latch-receiving slots formed in the outer shells that are coupled to armrests to retain the slidable tray top in one of several predetermined positions on the armrests.

Additional features of the present disclosure will become apparent to those skilled in the art upon consideration of illustrative embodiments exemplifying the best mode of carrying out the disclosure as presently perceived.

BRIEF DESCRIPTION OF THE DRAWINGS

The detailed description particularly refers to the accompanying figures in which:

FIGS. 6A-8A show movement of the slidable tray unit on the armrest of the first molded side frame;

DETAILED DESCRIPTION

Figures 1, 2:
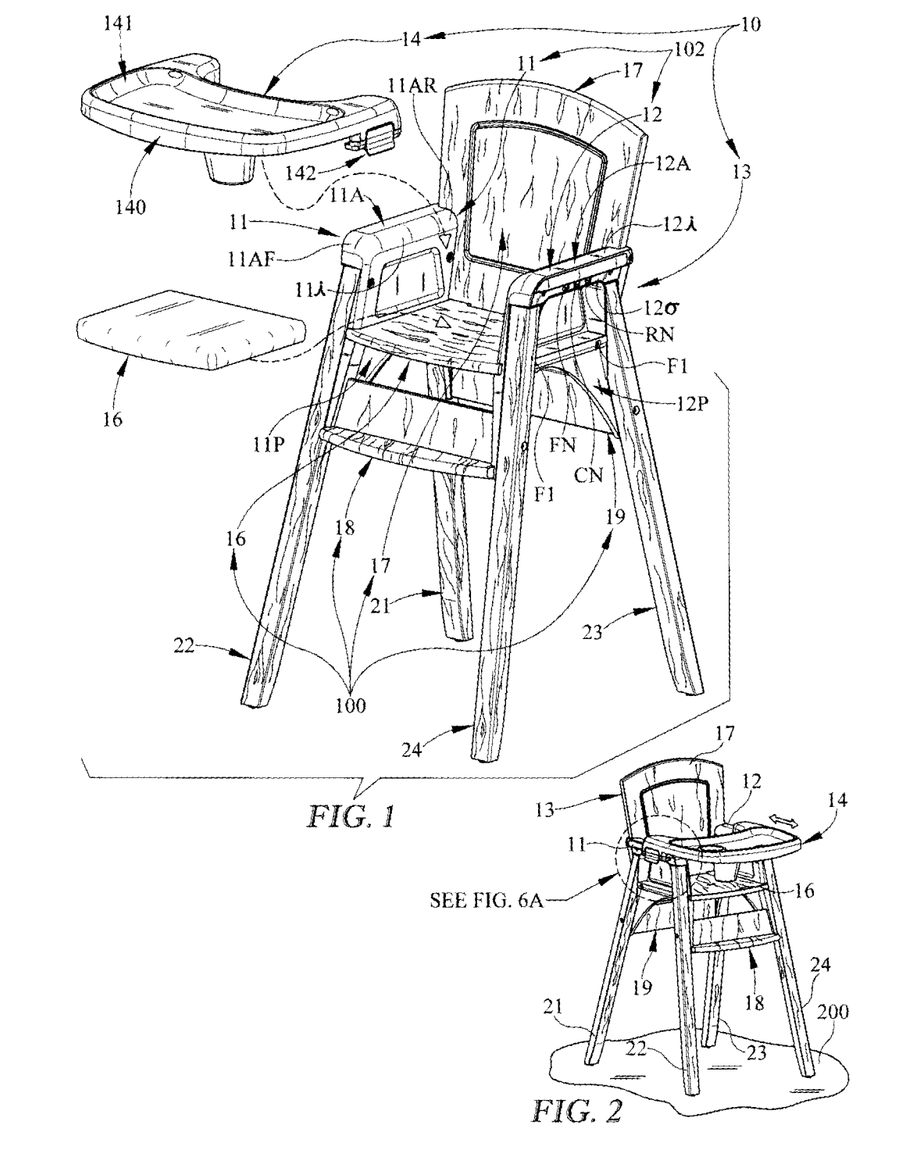
FIG. 1 is a perspective view of a juvenile seat assembly including separate first and second molded side frames made of molded plastics material and coupled to four legs, a footrest, a rear strut, a seat bottom, and a seat back to retain those components in stationary positions relative to one another and showing that the juvenile seat assembly further includes a seat pad and a tray unit configured to be mounted for sliding movement on armrests included in the first and second molded side frames.
FIG. 2 is a reduced-size perspective view of the juvenile seat assembly of FIG. 1 after a seat pad is mounted on a top surface of the seat bottom and the tray unit is mounted on first and second armrests flanking the seat pad on the seat bottom.

A juvenile seat assembly 10 including a chair 13 and a slidable tray unit 14 configured to be mounted on chair 13 is shown in FIGS. 1 and 2. Chair 13 is assembled using first and second molded side frames 11, 12 made of a molded plastics material and various components such as seat bottom 16, seat back 17, footrest 18, rear strut 19, and legs 21-24 along with a seat pad 16P as suggested in FIGS. 1 and 3-5. Each of those components extends into a component receiver formed in at least one of first and second molded side frames 11, 12 and is retained in a stationary position using one or more fasteners as suggested in FIGS. 1-5 to establish chair 13. In illustrative embodiments, each of those components is wooden.

Chair 13 appears to an observer to be made primarily of wood. Only first and second molded side frames 11, 12 are made of a molded plastics material in an illustrative embodiment. The fasteners can be made of any suitable material. It is within the scope of this disclosure to provide the parts comprising chair 13 in a ready-to-assemble kit as suggested in FIG. 3. It is within the scope of this disclosure to make seat bottom 16, seat back 17, footrest 18, rear strut 19, and legs 21-24 of any suitable materials.

Figure 3:
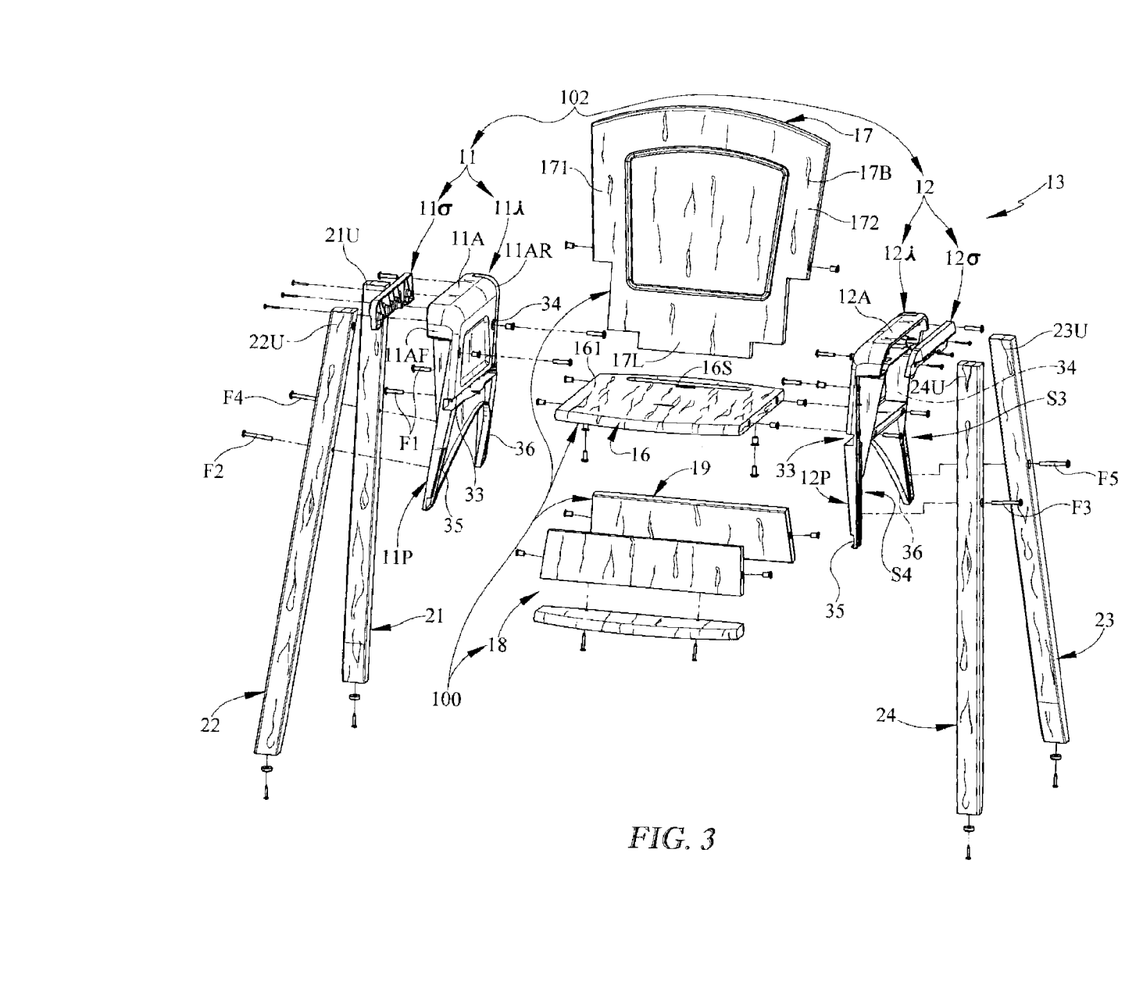
FIG. 3 is an exploded perspective assembly view of the components included in the juvenile seat assembly of FIG. 2.

First molded side frame 11 includes an inner shell 11i and a companion outer shell 11o as suggested in FIG. 3. Inner shell 11i is configured to mate with each of legs 21, 22, seat bottom 16, seat back 17, footrest 18, and rear strut 19. Outer shell 11o is arranged to lie in spaced-apart relation to seat bottom 16 to locate inner shell 11i therebetween. Each of inner and outer shells 11i, 11o are made of a molded plastics material in accordance with an illustrative embodiment.

Inner shell 11i of first molded side frame 11 includes a horizontally extending first armrest 11A and a component-mount plate 11P arranged to extend downwardly from first armrest 11A as suggested in FIG. 3. First armrest 11A is configured to mate with a first side of slidable tray unit 14 as suggested in FIGS. 6-8. Component-mount plate 11P is configured to mate with rear and front legs 21, 22, seat bottom 16, seat back 17, footrest 18, and rear strut 19.

Figures 4, 5:
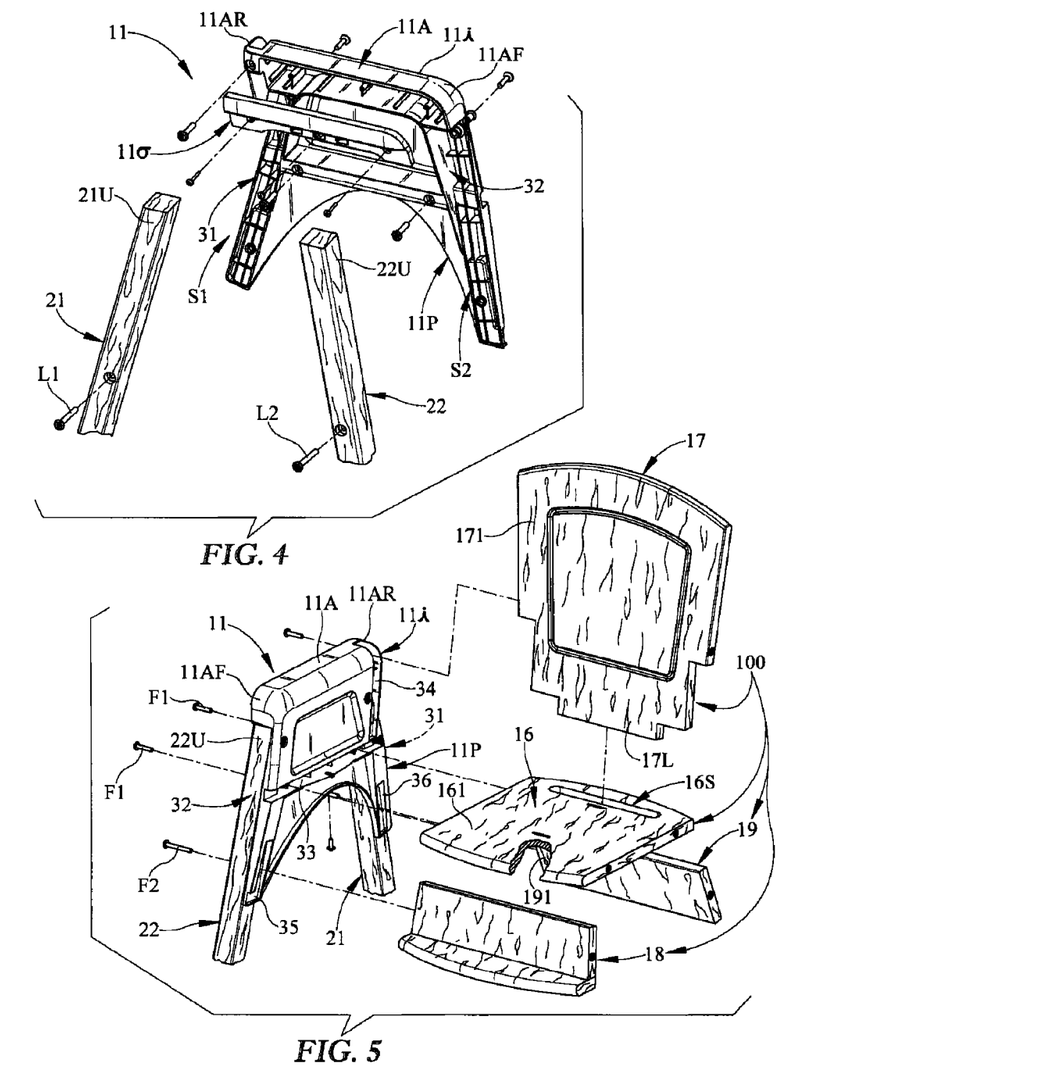
FIG. 4 is an enlarged perspective view of an outer side of the first side frame showing portions of front and rear legs before they are inserted into front and rear leg-receiving slots formed in the first molded side frame.
FIG. 5 is a perspective view of an inner side of the first molded side frame after the front and rear legs have been mounted in the front and rear leg-receiving slots and before the footrest, rear strut, seat bottom, and seat back are mounted in companion slots formed in the first molded side frame.
Figures 6A, 7A, 8A:
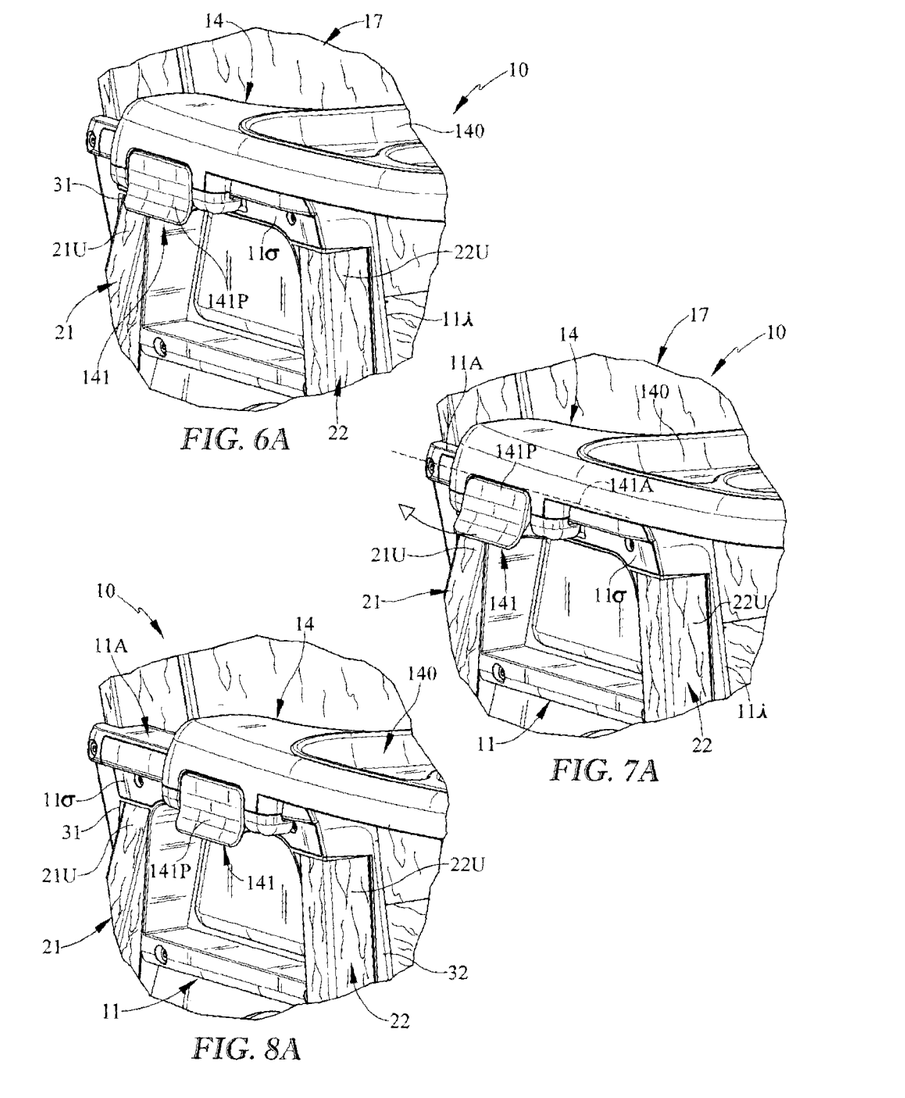
FIG. 6A is an enlarged partial perspective view taken from a circled region of FIG. 2 showing mating engagement of a first latch (that is mounted for movement relative to a slidable tray top) in a first latch-receiving notch formed in an outer shell coupled to an outboard portion of the first armrest (and shown, for example, in FIG. 9) to retain the slidable tray top in a retracted position close to the seat back.
FIG. 7A is a view similar to FIG. 6A showing outward pivoting movement of the first latch to disengage the first latch-receiving notch to free the slidable tray top to be moved by a caregiver on the first and second armrests away from the seat back to an extended position shown in FIG. 6C.
FIG. 8A is a view similar to FIGS. 6A and 6B showing engagement of the first latch in a third latch-receiving notch formed in the outer shell coupled to the outboard portion of the first armrest to retain the slidable tray top in an extended position on the first and second molded side arms.
Figures 6B, 7B:
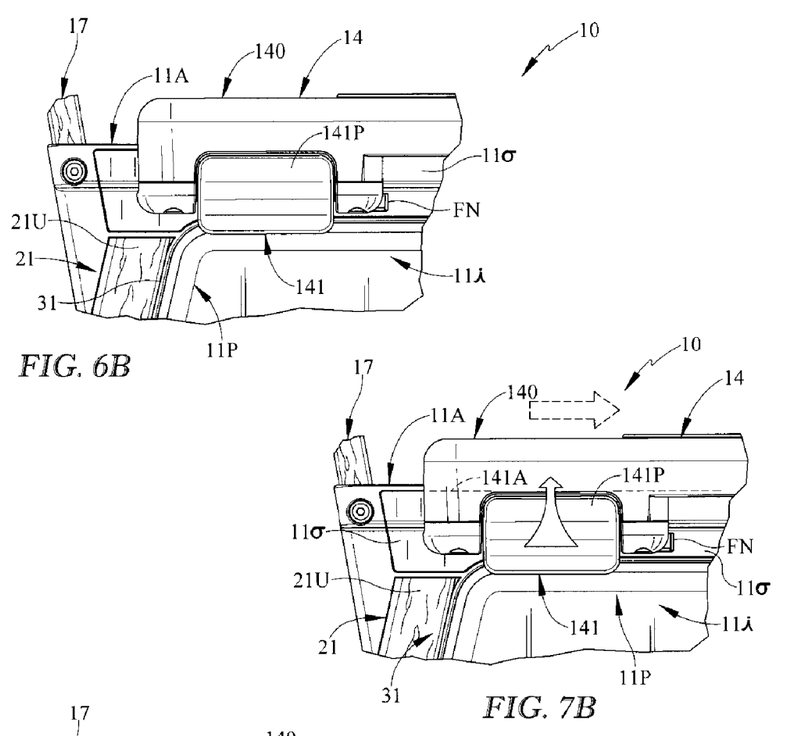
FIG. 6B is a side elevation view of the components shown in FIG. 6A.
FIG. 7B is a side elevation view of the components shown in FIG. 7A.
Figure 8B:
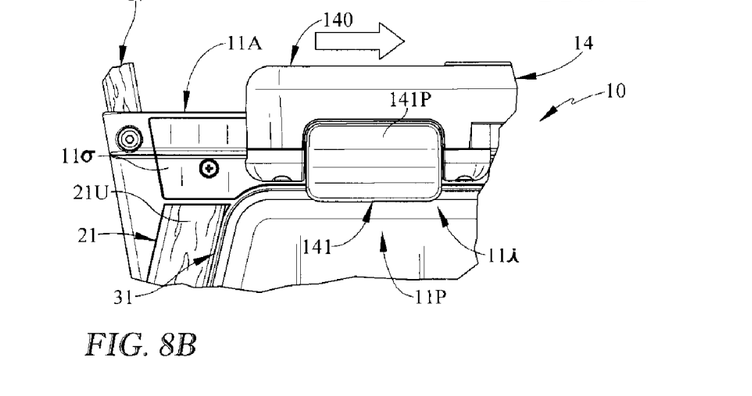
FIG. 8B is a side elevation view of the components shown in FIG. 8A.
Figure 9:
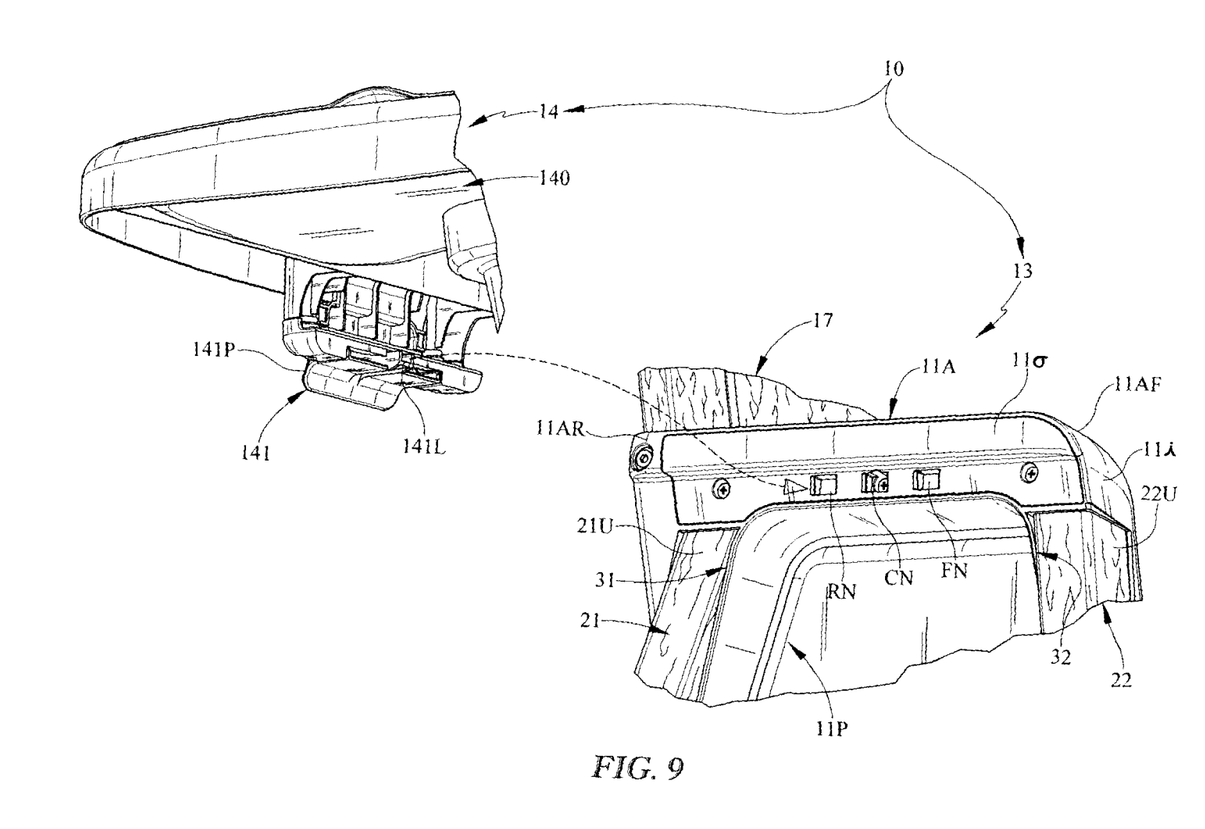
FIG. 9 is an enlarged partial perspective view of the components shown in FIGS. 6-8 showing the three latch-retaining notches formed in the outer shell that is coupled to the outboard portion of the first armrest and showing the companion first latch that is coupled to a first side of the slidable tray top and configured to engage a selected one of the three latch-retaining notches to retain the slidable tray top in a retracted, centered, or extended position on the armrests at the option of a caregiver.

Outer shell 11o of first side frame 11 mates with an outwardly facing portion of first armrest 11A as suggested in FIGS. 3, 4, and 9. Outer shell 11o is formed to include several latch-receiving notches that are sized and shaped to receive a movable first latch 141 included in slidable tray unit 14 to lock the slidable tray unit 14 in a position selected by a caregiver on the first and second armrests as suggested in FIGS. 6-8.

Second side frame 12 also includes an inner shell 12i and a companion outer shell 12o as suggested in FIG. 3. Inner shell 12i is configured to mate with each of legs 23, 24, seat bottom 16, seat back 17, footrest 18, and rear strut 19. Outer shell 12o is arranged to lie in spaced-apart relation to seat bottom 16 to locate inner shell 12i therebetween. Each of inner and outer shells 12i, 12o are made of a molded plastics material in accordance with an illustrative embodiment.

First outer shell 11o is coupled to an outboard portion of horizontally extending first armrest 11A to locate horizontally extending first armrest 11A between first outer shell 11o and seat bottom 16 as suggested in FIGS. 1 and 3. First outer shell 11o is formed to include a first latch-receiving notch (RN, CN, or FN) as suggested in FIG. 9. Slidable tray unit 14 includes a slidable tray top 140 mounted for back-and-forth sliding movement on first and second armrests 11A, 12A and a movable first latch 141 mounted on a first side of slidable tray top 140 for movement relative to slidable tray top 140 between a frame-engaging position engaging the first latch-receiving notch formed in first outer shell 11o to block sliding motion of the slidable tray top 140 relative to horizontally extending first armrest 11A and a frame-disengaging position disengaging the first latch-receiving notch to free slidable tray top 140 for sliding motion relative to horizontally extending first armrest 11A.

Inner shell 12i of second side frame 12 includes a horizontally extending second armrest 12A and a component-mount plate 12P arranged to extend downwardly from second armrest 12A as suggested in FIG. 3. Second armrest 12A is configured to mate with an opposite second side of slidable tray unit 14 as suggested in FIGS. 1 and 2. Component-mount plate 12P is configured to mate with rear and front legs 23, 24, seat bottom 16, seat back 17, seat back 12, and rear strut 19.

Figure 12:
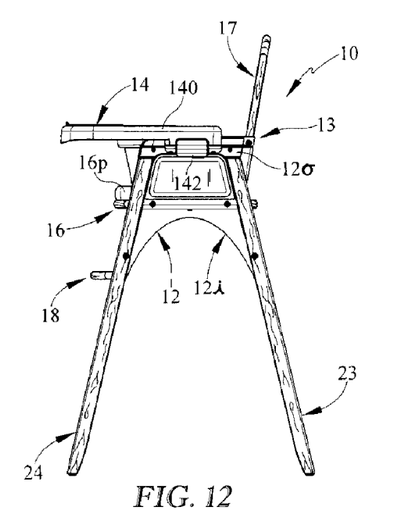
FIG. 12 is a right-side elevation view of the juvenile seat assembly shown in FIG. 1.
Figure 13:
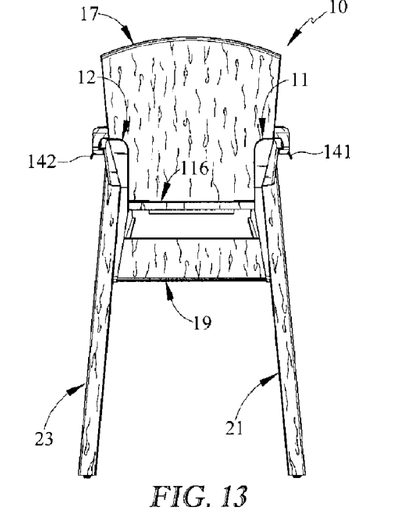
FIG. 13 is a rear elevation view of the juvenile seat assembly shown in FIG. 1.

Outer shell 12o of second side frame 12 mates with an outwardly facing portion of second armrest 12A as suggested in FIGS. 1, 3, and 12. Outer shell 12o is formed to include several latch-receiving notches that are sized and shaped to receive a movable second latch 142 included in slidable tray unit 14 to lock slidable tray unit 14 in a position selected by a caregiver on the first and second armrests as suggested in FIGS. 1 and 2.

First outer shell 12o is coupled to an outboard portion of horizontally extending first armrest 12A to locate horizontally extending first armrest 1A between first outer shell 12o and seat bottom 16 as suggested in FIGS. 1 and 3. First outer shell 12o is formed to include a first latch-receiving notch (RN, CN, or FN) as suggested in FIG. 9. Slidable tray unit 14 includes a slidable tray top 140 mounted for back-and-forth sliding movement on first and second armrests 11A, 12A and a movable first latch 241 mounted on a first side of slidable tray top 140 for movement relative to slidable tray top 140 between a frame-engaging position engaging the first latch-receiving notch formed in first outer shell 12o to block sliding motion of the slidable tray top 140 relative to horizontally extending first armrest 12A and a frame-disengaging position disengaging the first latch-receiving notch to free slidable tray top 140 for sliding motion relative to horizontally extending first armrest 12A.

Several of the wooden components included in chair 13 are mounted on molded first side frame 11 in an illustrative manner shown in FIGS. 4 and 5. Wooden components included in chair 13 can also be mounted on molded second side frame 12 in a similar manner as suggested in FIG. 3.

Figure 10:
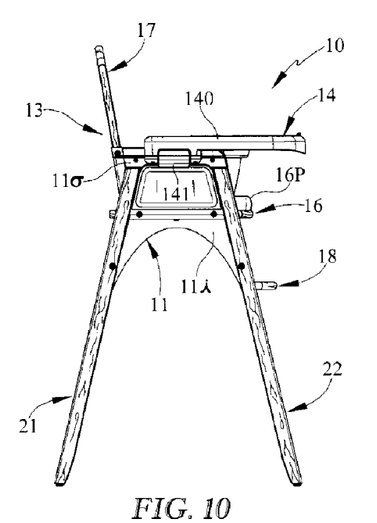
FIG. 10 is a left-side elevation view of the juvenile seat assembly shown in FIG. 1.
Figure 11:
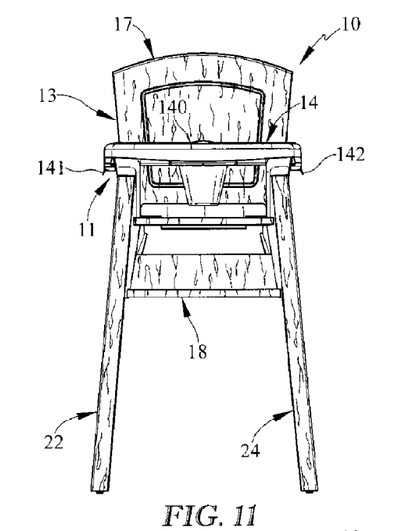
FIG. 11 is a front elevation view of the juvenile seat assembly shown in FIG. 1.

Rear and front legs 21, 22 are mounted on an exterior portion of first molded side frame 11 as suggested in FIGS. 2-4. An outboard side of component-mount plate 11P of first molded side frame 11 is formed to include a rear leg-receiving slot 31 terminating at a rearward end 11AR of first armrest 11A and a front leg-receiving slot 32 terminating at a forward end 11AF of first armrest 11A as shown, for example, in FIG. 4. An upper portion 21U of rear leg 21 is sized and shaped to extend into rear leg-receiving slot 31 and is anchored to component-mount plate 11P of first molded side frame 11 using fasteners. An upper portion 22U of front leg 22 is sized and shaped to extend into front leg-receiving slot 32 and is anchored to component-mount plate 11P of first molded side frame 11 using fasteners. Rear and front leg-receiving slots 31, 32 are oriented to diverge in a direction extending away from first armrest 11A as suggested in FIG. 4 to cause rear and front legs 21, 22 to diverge in a direction extending away from first armrest 11A when those legs 21, 22 are mounted in the companion slots 31, 32 as suggested in FIGS. 5 and 10.

Seat bottom 16, seat back 17, footrest 18, and rear strut 19 are mounted on an interior portion of first molded side frame 11 as suggested in FIGS. 1, 3, and 4. An inboard side of component-mount plate 11P of first molded side frame 11 is formed to include a horizontally extending seat bottom-receiving slot 33, a generally vertically extending seat back-receiving slot 34, an L-shaped footrest-receiving slot 35, and a negatively sloping rear strut-receiving slot 36 as shown, for example, in FIG. 5. A first side portion 161 of seat bottom 16 is sized and shaped to extend into seat bottom-receiving slot 33. A first side 171 of seat back 17 is sized and shaped to extend into seat back-receiving slot 34 when a downwardly extending lug 17L of seat back 17 extends into a lug-receiving slot 16S formed in a rear portion of seat bottom 16 as suggested in FIG. 5. An L-shaped first side portion 181 of footrest 18 is sized and shaped to extend into L-shaped footrest-receiving slot 35 as suggested in FIG. 5. A first side portion 191 of rear strut 19 is sized and shaped to extend into rear strut-receiving slot 36 as suggested in FIG. 5.

Slidable tray unit 14 includes a slidable tray top 140, a movable first latch 141 mounted for movement to a first side of tray top 140, and a movable second latch 142 mounted for movement to an opposite second side of tray top 140 as suggested in FIGS. 1, 2, and 6-8. Tray top 140 is slidable toward and away from seat back 17 on first and second armrests 11A, 12A. Each latch 141, 142 is movable relative to tray top 140 to engage and disengage a latch-receiving notch formed in one of first and second molded side frames 11, 12. In illustrative embodiments, outer shell 11o of first molded side frame 11 is formed to include a rear notch RN, a center notch CN, and a forward notch FN as shown best in FIG. 9. Similarly, outer shell 12o of second molded side frame 12 is formed to include a rear notch RN, a center notch CN, and a forward notch FN as shown best in FIG. 1.

Tray top 140 is arranged to slide on first and second armrests 11A, 12A toward and away (see double arrow) from seat back 17 as suggested in FIG. 2. First latch 141 includes a lug 141L coupled to a lug-mover plate 141P that is mounted on table top 140 for movement about a pivot axis 141A as suggested in FIGS. 7A and 7B. Lug 141L is sized and shaped to extend into a selected one of rear notch RN, center notch CN, or forward notch FN formed in outer shell 11o of first molded side frame 11 to establish the position of tray top 140 on first and second armrests 11, 12 as suggested in FIG. 9.

When all of the components that cooperate to form juvenile seat assembly 10 are disassembled, they fit easily into a flat pack for shipping. Ease of assembly is enhanced because most of the fasteners in an illustrative embodiment are arranged to extend in generally horizontal directions s suggested in FIG. 3 owing to the orientation of the wooden components relative to the first and second molded side frames 11, 12.

First and second molded side frames 11, 12 are made of plastics materials and are formed to include various slots or features for receiving companion members therein. These slots are molded into outboard and inboard sides of first and second molded side frames 11, 12 in illustrative embodiments of the present disclosure. Side frames 11, 12 cooperate and mate with companion components 16-19 and 21-24 to create a stable box configuration that will not require lower cross members. Legs 21-24 are aligned relative to side frames 11, 12 to extend into frame slots (and not rotated or otherwise twisted about an axis) to simplify tooling of side frames 11, 12. Each rear leg 21, 23 extends up to one of armrests 11A, 12A to provide stable connections. Outer shells 11o, 12o of side frames lie outside of armrests 11A, 12A to fill an otherwise open cavity formed in armrests 11A, 12A and are formed to include latch-receiving notches RN, CN, and FN. Seat back 17 is factory assembled.

A juvenile seat assembly 10 in accordance with the present disclosure includes a seat 100 and a seat foundation 102 as suggested in FIGS. 1 and 3. Seat 100 includes a seat bottom 16, a seat back 17, a footrest 18, and a rear strut 19 as shown, for example, in FIGS. 1, 3, and 5. Each of these components 16-19 is coupled to seat foundation 102 so that the components 16-19 cooperate to form seat 100.

Seat foundation 102 includes first and second molded side frames 11, 12 and a series of fasteners associated with each side frame 11, 12 as suggested in FIGS. 1 and 3. First molded side frame 11 is made of a plastics material and coupled to a first side of seat bottom 16. Second molded side frame 12 is made of a plastics material and coupled to an opposite second side of seat bottom 16 to locate seat bottom 16 between first and second molded side frames 11, 12 as suggested in FIGS. 1 and 3.

Seat foundation 102 also includes four legs 21-24 as suggested in FIGS. 1-3. These four legs 21-24 are wooden in an illustrative embodiment. First and second legs 21, 22 are coupled to first molded side frame 11 and arranged to lie in spaced-apart relation to one another to elevate first molded side frame 11 above ground 200 underlying seat bottom 16 as suggested in FIG. 2. Third and fourth legs 23, 24 are coupled to second molded side frame 12 and arranged to lie in spaced-apart relation to one another to elevate second molded side frame 12 and seat bottom 16 above ground 200 underlying seat bottom 16 as suggested in FIG. 2.

First molded side frame 11 includes a horizontally extending first armrest 11A and a first component-mount plate 11P that is arranged to extend downwardly from first armrest 11A and to mate with the first side of seat bottom 16 as suggested in FIGS. 3-5. Second molded side frame 12 includes a horizontally extending second armrest 12A and a second component-mount plate 12P that is arranged to extend downwardly from second armrest 12A and to mate with the opposite second side of seat bottom 16 as suggested in FIG. 3.

Each of the first and second component-mount plates 11P, 12P is formed to include a horizontally extending seat bottom-receiving slot 33 as suggested in FIG. 3. The first side of seat bottom 16 is arranged to extend into horizontally extending seat bottom-receiving slot 33 formed in the first component-mount plate 11P as suggested in FIGS. 1 and 3. The opposite second side of seat bottom 16 is arranged to extend into horizontally extending seat bottom-receiving slot 33 formed in second component-mount plate 12P as also suggested in FIGS. 1 and 3.

Seat 100 further includes a seat back 17 as suggested in FIGS. 1-3. First molded side frame 11 is formed to include a generally vertically extending seat back-receiving slot 34 as suggested in FIG. 3. An upper portion of vertically extending seat back-receiving slot 34 is formed in rearward end 11AR of first armrest 11 as suggested in FIG. 3. A lower portion of vertically extending seat back-receiving slot 34 is formed in first component-mount plate 11P as suggested in FIG. 3. A first side of seat back 16 is arranged to extend into the upper and lower portions of vertically extending seat back-receiving slot 34 as suggested in FIGS. 1 and 3.

Seat bottom 16 is formed to include a lug-receiving slot 16S along a rear edge thereof as shown, for example, in FIGS. 3 and 5. Seat back 17 includes a backrest 17B formed to include the first and second sides 171, 172 of seat back 17 and a downwardly extending lug 17L coupled to backrest 17B and arranged to extend downwardly into lug-receiving slot 16S formed in seat bottom 16 as suggested in FIGS. 1 and 3. Seat foundation 102 further includes two fasteners F1 that are arranged to extend in sequence through companion apertures formed in first armrest 11A of first molded side frame 11 and into a portion of the first side 171 of seat back 17 located in the upper portion of vertically extending seat back-receiving slot 34 as suggested in FIG. 5.

Seat 100 further includes a footrest 18 as suggested in FIGS. 1-3. Each of first and second component-mount plates 11, 12 is formed to include a footrest-receiving slot 35 as suggested in FIG. 3. A first side of footrest 18 is arranged to extend into footrest-receiving slot 35 formed in first component-mount plate 11P as suggested in FIGS. 1, 3, and 5. An opposite second side of footrest 18 is arranged to extend into footrest-receiving slot 35 formed in second component-mount plate 12P as suggested in FIGS. 1 and 3. Each footrest-receiving slot is L-shaped as suggested in FIGS. 3 and 5. Each of the first and opposite second sides of footrest 18 is L-shaped in cross section as suggested in FIG. 5.

Seat foundation 102 further includes first and second fasteners F2, F3 as shown, for example, in FIG. 3. First fastener F2 is arranged to extend in sequence through an aperture formed in first component-mount plate 11P and into a portion of the first side of footrest 18 located in footrest-receiving slot 35 formed in first component-mount plate 11P. Second fastener F3 is arranged to extend in sequence through an aperture formed in second component-mount plate 12P and into a portion of the opposite second side of footrest 18 located in footrest-receiving slot 35 formed in second component-mount plate 12P.

Seat 100 further includes a rear strut 19 as suggested in FIGS. 1 and 3. Each of first and second component-mount plates 11P, 12P is formed to include a strut-receiving slot 36 as suggested in FIG. 3. A first side of rear strut 19 is arranged to extend into strut-receiving slot 36 formed in first component-mount plate 11P as suggested in FIGS. 1, 3, and 5. An opposite second side of the rear strut 19 is arranged to extend into strut-receiving slot 36 formed in second component-mount plate 12P. Seat foundation 102 further includes a first fastener F4 arranged to extend in sequence through an aperture formed in first component-mount plate 11P and into a portion of the first side 191 of rear strut 19 located in strut-receiving slot 36 formed in first component-mount plate 11P as suggested in FIG. 3 and a second fastener F5 arranged to extend in sequence through an aperture formed in second component-mount plate 12P and into a portion of the opposite second side 192 of rear strut 19 located in strut-receiving slot 36 formed in second component-mount plate 12P as suggested in FIG. 3.

Seat foundation 102 further includes first and second leg-fasteners L1, L2 as suggested in FIG. 4. First leg fastener L1 is arranged to extend in sequence through an upper portion of first leg 21 and a first-leg aperture formed in first component-mount plate 11P of first molded side frame 11 to retain first leg 21 in a stationary position relative to first component-mount plate 11P of first molded side frame 11 as suggested in FIG. 4. Second leg fastener L2 is arranged to extend in sequence through an upper portion of second leg 22 and a second-leg aperture formed in first component-mount plate 11P of first molded side frame 11 to retain second leg 21 in a stationary position relative to first component-mount plate 11P of first molded side frame 11 as suggested in FIG. 4.

First component-mount plate 11P is formed to include a rear leg-receiving slot S1 facing outwardly away from seat bottom 16 in a first direction and receiving a portion of first leg 21 therein and a front leg-receiving slot S2 facing outwardly away from seat bottom 16 in the first direction and receiving a portion of second leg 22 therein as suggested in FIG. 4. Second component-mount plate 12P is formed to include a rear leg-receiving slot S3 facing outwardly away from seat bottom 16 in an opposite second direction and receiving a portion of third leg 23 therein and a front leg-receiving slot S4 facing outwardly away from seat bottom 16 in the opposite second direction and receiving a portion of fourth leg 24 therein as suggested in FIG. 4.

Each of first and second molded side frames 11, 12 is formed to include a horizontally extending seat-bottom receiving slot 33 and a vertically extending seat back-receiving slot 34 as suggested in FIG. 3. A first side of seat bottom 16 is arranged to extend into horizontally extending seat bottom-receiving slot 34 formed in first molded side frame 11 as suggested in FIGS. 1, 3, and 5. An opposite second side of seat bottom 16 is arranged to extend into horizontally extending seat bottom-receiving slot 33 formed in second molded side frame 12. A first side 171 of seat back 17 is included in backrest 17B and arranged to extend into vertically extending eat back-receiving slot 34 formed in first molded side frame 11 as suggested in FIG. 5. An opposite second side 172 of seat back 17 is included in backrest 17B and arranged to extend into vertically extending seat back-receiving slot 34 formed in second molded side frame 12 as suggested in FIG. 3.

Seat foundation 102 further includes a first fastener F1 arranged to extend in sequence through a first aperture formed in first molded side frame 11 and into a portion of seat bottom 16 located in horizontally extending seat bottom-receiving slot 33 formed in first molded side frame 11 to retain seat bottom 16 in a stationary position relative to first molded side frame 11 as suggested in FIG. 5. Seat foundation 102 further includes a second fastener F1 arranged to extend in sequence through a second aperture formed in first molded side frame 11 and into a portion of seat bottom 16 located in the horizontally extending seat bottom-receiving slot 33 formed in first molded side frame 11 to retain seat bottom in a stationary position relative to first molded side frame 11 as suggested in FIG. 5. Seat foundation 102 further includes a third fastener F1 arranged to extend in sequence through a first aperture formed in second molded side frame 12 and into a portion of seat bottom 16 located in horizontally extending seat bottom-receiving slot 33 formed in second molded side frame 12 to retain seat bottom 16 in a stationary position relative to second molded side frame 12 as suggested in FIG. 1. Seat foundation 102 further includes a fourth fastener F1 arranged to extend in sequence through a second aperture formed in second molded side frame 12 and into a portion of seat bottom 16 located in horizontally extending seat bottom-receiving slot 33 formed in second molded side frame 12 to retain seat bottom 16 in a stationary position relative to second molded side frame 12 as suggested in FIG. 1.

The invention claimed is:

1. A juvenile seat assembly comprising
a seat including a seat bottom,
a seat foundation including a first molded side frame made of a plastics material and coupled to a first side of the seat bottom, a second molded side frame made of a plastics material and coupled to an opposite second side of the seat bottom to locate the seat bottom between the first and second molded side frames, first and second legs coupled to the first molded side frame and arranged to lie in spaced-apart relation to one another to elevate the first molded side frame above ground underlying the seat bottom, and third and fourth legs coupled to the second molded side frame and arranged to lie in spaced-apart relation to one another to elevate the second molded side frame and the seat bottom above the ground underlying the seat bottom,
wherein the first molded side frame includes a horizontally extending first armrest and a first component-mount plate arranged to extend downwardly from the first armrest and to mate with the first side of the seat bottom and the second molded side frame includes a horizontally extending second armrest and a second component-mount plate arranged to extend downwardly from the second armrest and to mate with the opposite second side of the seat bottom, and wherein each of the first and second component-mount plates is formed to include a horizontally extending seat bottom-receiving slot, the first side of the seat bottom is arranged to extend into the horizontally extending seat bottom-receiving slot formed in the first component-mount plate, and the opposite second side of the seat bottom is arranged to extend into the horizontally extending seat bottom-receiving slot formed in the second component-mount plate.

2. The assembly of claim 1, wherein the seat further includes a seat back, the first molded side frame is formed to include a vertically extending seat back-receiving slot, an upper portion of the vertically extending seat back-receiving slot is formed in the first armrest, a lower portion of the vertically extending seat back-receiving slot is formed in the first component-mount plate, and a first side of the seat back is arranged to extend into the upper and lower portions of the vertically extending seat back-receiving slot.

3. The assembly of claim 2, wherein the seat bottom is formed to include a lug-receiving slot and the seat back includes a backrest formed to include the first side of the seat back and a downwardly extending lug coupled to the backrest and arranged to extend downwardly into the lug-receiving slot formed in the seat bottom.

4. The assembly of claim 3, wherein the seat foundation further includes a fastener arranged to extend in sequence through an aperture formed in the first armrest of the first molded side frame and into a portion of the first side of the seat back located in the upper portion of the vertically extending seat back-receiving slot.

5. The assembly of claim 1, wherein the seat further includes a footrest, each of the first and second component-mount plates is formed to include a footrest-receiving slot, a first side of the footrest is arranged to extend into the footrest-receiving slot formed in the first component-mount plate, and an opposite second side of the footrest is arranged to extend into the footrest-receiving slot formed in the second component-mount plate.

6. The assembly of claim 5, wherein each footrest-receiving slot is L-shaped and each of the first and opposite second sides of the footrest is L-shaped in cross section.

7. The assembly of claim 5, wherein the seat foundation further includes a first fastener arranged to extend in sequence through an aperture formed in the first component-mount plate and into a portion of the first side of the footrest located in the footrest-receiving slot formed in the first component-mount plate and a second fastener arranged to extend in sequence through an aperture formed in the second component-mount plate and into a portion of the opposite second side of the footrest located in the footrest-receiving slot formed in the second component-mount plate.

8. The assembly of claim 5, wherein the seat further includes a rear strut, each of the first and second component-mount plates is formed to include a strut-receiving slot, a first side of the rear strut is arranged to extend into the strut-receiving slot formed in the first component-mount plate, and an opposite second side of the rear strut is arranged to extend into the strut-receiving slot formed in the second component-mount plate.

9. The assembly of claim 8, wherein the seat foundation further includes a first fastener arranged to extend in sequence through an aperture formed in the first component-mount plate and into a portion of the first side of the rear strut located in the strut-receiving slot formed in the first component-mount plate and a second fastener arranged to extend in sequence through an aperture formed in the second component-mount plate and into a portion of the opposite second side of the rear strut located in the strut-receiving slot formed in the second component-mount plate.

10. The assembly of claim 8, wherein the seat further includes a seat back, the first molded side frame is formed to include a vertically extending seat back-receiving slot, an upper portion of the vertically extending seat back-receiving slot is formed in the first armrest, a lower portion of the vertically extending seat back-receiving slot is formed in the first component-mount plate, and a first side of the seat back is arranged to extend into the upper and lower portions of the vertically extending seat back-receiving slot.

11. The assembly of claim 10, wherein the seat bottom is formed to include a lug-receiving slot and the seat back includes a backrest formed to include the first side of the seat back and a downwardly extending lug coupled to the backrest and arranged to extend downwardly into the lug-receiving seat bottom formed in the seat bottom.

12. The assembly of claim 11, wherein the seat foundation further includes a fastener arranged to extend in sequence through an aperture formed in the first armrest of the first molded side frame and into a portion of the first side of the seat back located in the upper portion of the vertically extending seat back-receiving slot.

13. The assembly of claim 1, wherein the seat foundation further includes a first fastener arranged to extend in sequence through a first aperture formed in the first component-mount plate of the first molded side frame and into a portion of the first side of the seat bottom located in the horizontally extending seat bottom-receiving slot to retain the seat bottom in a stationary position relative to the first component-mount plate of the first molded side frame.

14. The assembly of claim 13, wherein the seat foundation further includes a first leg fastener arranged to extend in sequence through an upper portion of the first leg and a first-leg aperture formed in the first component-mount plate of the first molded side frame to retain the first leg in a stationary position relative to the first component-mount plate of the first molded side frame and a second leg fastener arranged to extend in sequence through an upper portion of the second leg and a second-leg aperture formed in the first component-mount plate of the first molded side frame to retain the second leg in a stationary position relative to the first component-mount plate of the first molded side frame.

15. The assembly of claim 1, wherein the first component-mount plate is formed to include a rear leg-receiving slot facing outwardly away from the seat bottom in a first direction and receiving a portion of the first leg therein and a front leg-receiving slot facing outwardly away from the seat bottom in the first direction and receiving a portion of the second leg therein.

16. The assembly of claim 15, wherein the second component-mount plate is formed to include a rear leg-receiving slot facing outwardly away from the seat bottom in an opposite second direction and receiving a portion of the third leg therein and a front leg-receiving slot facing outwardly away from the seat bottom in the opposite second direction and receiving a portion of the third leg therein and a rear leg-receiving slot facing outwardly away from the seat bottom in the opposite second direction and receiving a portion of the fourth leg therein.

17. A juvenile seat assembly comprising
a seat including a seat bottom,
a seat foundation including a first molded side frame made of a plastics material and coupled to a first side of the seat bottom, a second molded side frame made of a plastics material and coupled to an opposite second side of the seat bottom to locate the seat bottom between the first and second molded side frames, first and second legs coupled to the first molded side frame and arranged to lie in spaced-apart relation to one another to elevate the first molded side frame above ground underlying the seat bottom, and third and fourth legs coupled to the second molded side frame and arranged to lie in spaced-apart relation to one another to elevate the second molded side frame and the seat bottom above the ground underlying the seat bottom,
wherein the first molded side frame includes a horizontally extending first armrest and a first component-mount plate arranged to extend downwardly from the first armrest and to mate with the first side of the seat bottom and the second molded side frame includes a horizontally extending second armrest and a second component-mount plate arranged to extend downwardly from the second armrest and to mate with the opposite second side of the seat bottom, and
wherein the seat further includes a wooden seat back, a wooden footrest, and a wooden rear strut, a first side of each of the wooden seat back, footrest, and rear strut extends into a companion slot formed in the first component-mount plate to open toward the second component-mount plate, and an opposite second side of each of the wooden seat back, footrest, and rear strut extends into a companion slot formed in the second component-mount plate to open toward the first component-mount plate.

18. The assembly of claim 17, wherein each of the first and opposite second sides of the wooden footrest is L-shaped and each of the companion slots formed to receive the first and opposite second sides of the wooden footrest is also L-shaped.

19. A juvenile seat assembly comprising
a seat including a seat bottom,
a seat foundation including a first molded side frame made of a plastics material and coupled to a first side of the seat bottom, a second molded side frame made of a plastics material and coupled to an opposite second side of the seat bottom to locate the seat bottom between the first and second molded side frames, first and second legs coupled to the first molded side frame and arranged to lie in spaced-apart relation to one another to elevate the first molded side frame above ground underlying the seat bottom, and third and fourth legs coupled to the second molded side frame and arranged to lie in spaced-apart relation to one another to elevate the second molded side frame and the seat bottom above the ground underlying the seat bottom,
wherein the first molded side frame includes a horizontally extending first armrest and a first component-mount plate arranged to extend downwardly from the first armrest and to mate with the first side of the seat bottom and the second molded side frame includes a horizontally extending second armrest and a second component-mount plate arranged to extend downwardly from the second armrest and to mate with the opposite second side of the seat bottom, and
wherein the first molded side frame further includes a first outer shell coupled to an outboard portion of the horizontally extending first armrest to locate the horizontally extending first armrest between the first outer shell and the seat bottom and the first outer shell is formed to include a first latch-receiving notch and further comprising a slidable tray unit including a slidable tray top mounted for back-and-forth sliding movement on the first and second armrests and a movable first latch mounted on a first side of the slidable tray top for movement relative to the slidable tray top between a frame-engaging position engaging the first latch-receiving notch formed in the first outer shell to block sliding motion of the slidable tray top relative to the horizontally extending first armrest and a frame-disengaging position disengaging the first latch-receiving notch to free the slidable tray top for sliding motion relative to the horizontally extending first armrest.

20. The assembly of claim 19, wherein the horizontally extending first armrest and the first component-mount plate cooperate to form a monolithic first inner shell.

21. A juvenile seat assembly comprising
a seat including a seat bottom,
a seat foundation including a first molded side frame made of a plastics material and coupled to a first side of the seat bottom, a second molded side frame made of a plastics material and coupled to an opposite second side of the seat bottom to locate the seat bottom between the first and second molded side frames, first and second legs coupled to the first molded side frame and arranged to lie in spaced-apart relation to one another to elevate the first molded side frame above ground underlying the seat bottom, and third and fourth legs coupled to the second molded side frame and arranged to lie in spaced-apart relation to one another to elevate the second molded side frame and the seat bottom above the ground underlying the seat bottom,
wherein the seat further includes a seat back arranged to extend upwardly from the seat bottom, a first side of the seat back is coupled to the first molded side frame, and an opposite second side of the seat back is coupled to the second molded side frame, and
wherein the seat bottom is formed to include a lug-receiving slot and the seat back includes a backrest coupled to each of the first and second molded side frames and a downwardly extending lug coupled to the backrest and arranged to extend into the lug-receiving slot to retain the seat back in a fixed position relative to the seat bottom.

22. The assembly of claim 21, wherein each of the first and second molded side frames is formed to include a horizontally extending seat bottom-receiving slot and a vertically extending seat back-receiving slot, the first side of the seat bottom is arranged to extend into the horizontally extending seat bottom-receiving slot formed in the first molded side frame, the first side of the seat back is included in the backrest and arranged to extend into the vertically extending seat back-receiving slot formed in the first molded side frame, the opposite second side of the seat bottom is arranged to extend into the horizontally extending seat bottom-receiving slot formed in the second molded side frame, and the opposite second side of the seat back is included in the backrest and arranged to extend into the vertically extending seat back-receiving slot formed in the second molded side frame.

23. The assembly of claim 22, wherein the seat foundation further includes a first fastener arranged to extend in sequence through a first aperture formed in the first molded side frame and into a portion of the seat bottom located in the horizontally extending seat bottom-receiving slot formed in the first molded side frame to retain the seat bottom in a stationary position relative to the first molded side frame, the seat foundation further includes a second fastener arranged to extend in sequence through a second aperture formed in the first molded side frame and into a portion of the seat bottom located in the horizontally extending seat bottom-receiving slot formed in the first molded side frame to retain the seat bottom in a stationary position relative to the first molded side frame, the seat foundation further includes a third fastener arranged to extend in sequence through a first aperture formed in the second molded side frame and into a portion of the seat bottom located in the horizontally extending seat bottom-receiving slot formed in the second molded side frame to retain the seat bottom in a stationary position relative to the second molded side frame, and the seat foundation further includes a fourth fastener arranged to extend in sequence through a second aperture formed in the second molded side frame and into a portion of the seat bottom located in the horizontally extending seat bottom-receiving slot formed in the second molded side frame to retain the seat bottom in a stationary position relative to the second molded side frame.

24. A juvenile seat assembly comprising
a seat including a seat bottom,
a seat foundation including a first molded side frame made of a plastics material and coupled to a first side of the seat bottom, a second molded side frame made of a plastics material and coupled to an opposite second side of the seat bottom to locate the seat bottom between the first and second molded side frames, first and second legs coupled to the first molded side frame and arranged to lie in spaced-apart relation to one another to elevate the first molded side frame above ground underlying the seat bottom, and third and fourth legs coupled to the second molded side frame and arranged to lie in spaced-apart relation to one another to elevate the second molded side frame and the seat bottom above the ground underlying the seat bottom,
wherein the seat further includes a seat back arranged to extend upwardly from the seat bottom, a first side of the seat back is coupled to the first molded side frame, and an opposite second side of the seat back is coupled to the second molded side frame, and
wherein each of the first and second molded side frames is formed to include a horizontally extending seat bottom-receiving slot and a vertically extending seat back-receiving slot, the first side of the seat bottom is arranged to extend into the horizontally extending seat bottom-receiving slot formed in the first molded side frame, the first side of the seat back is included in the backrest and arranged to extend into the vertically extending seat back-receiving slot formed in the first molded side frame, the opposite second side of the seat bottom is arranged to extend into the horizontally extending seat bottom-receiving slot formed in the second molded side frame, and the opposite second side of the seat back is included in the backrest and arranged to extend into the vertically extending seat back-receiving slot formed in the second molded side frame.

25. The assembly of claim 24, wherein the seat further includes a footrest, each of the first and second component-mount plates is formed to include a footrest-receiving slot, a first side of the footrest is arranged to extend into the footrest-receiving slot formed in the first component-mount plate, and an opposite second side of the footrest is arranged to extend into the footrest-receiving slot formed in the second component-mount plate.

26. The assembly of claim 25, wherein the seat further includes a rear strut, each of the first and second component-mount plates is formed to include a strut-receiving slot, a first side of the footrest is arranged to extend into the strut-receiving slot formed in the first component-mount plate, and an opposite second side of the footrest is arranged to extend into the strut-receiving slot formed in the second component-mount plate.

27. The assembly of claim 24, wherein the seat further includes a rear strut, each of the first and second component-mount plates is formed to include a strut-receiving slot, a first side of the footrest is arranged to extend into the strut-receiving slot formed in the first component-mount plate, and an opposite second side of the footrest is arranged to extend into the strut-receiving slot formed in the second component-mount plate.

* * * * *